(12) United States Patent
Carroll

(10) Patent No.: US 7,059,343 B2
(45) Date of Patent: *Jun. 13, 2006

(54) DIRECT ACTING GAS REGULATOR

(75) Inventor: Kent L. Carroll, Bolingbrook, IL (US)

(73) Assignee: Pressure Specialist, Inc., Crystal Lake, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/984,277

(22) Filed: Nov. 9, 2004

(65) Prior Publication Data

US 2005/0103383 A1    May 19, 2005

Related U.S. Application Data

(63) Continuation of application No. 10/653,592, filed on Sep. 2, 2003, now Pat. No. 6,851,447.

(51) Int. Cl.
*G05D 16/10* (2006.01)
(52) U.S. Cl. .................. 137/505.25; 137/613
(58) Field of Classification Search ........... 137/505.25, 137/505.28, 613
See application file for complete search history.

(56) References Cited

U.S. PATENT DOCUMENTS

| | | | |
|---|---|---|---|
| 2,615,287 A | 10/1952 | Senesky | |
| 2,918,081 A | 12/1959 | Lauer, Jr. | |
| 3,437,109 A | 4/1969 | Carlson et al. | |
| 3,474,822 A | 10/1969 | Kuhn et al. | |
| 3,848,631 A | 11/1974 | Fallon | |
| 3,890,999 A | 6/1975 | Moskow | |
| 3,995,656 A * | 12/1976 | Mills, Jr. | 137/497 |
| 4,064,890 A | 12/1977 | Collins et al. | |
| 4,181,139 A | 1/1980 | Martini | |
| 4,194,522 A | 3/1980 | Lucas et al. | |
| 4,226,257 A | 10/1980 | Trinkwalder | |
| 4,305,423 A | 12/1981 | Adler | |
| 4,450,858 A | 5/1984 | Acomb | |
| 4,785,847 A * | 11/1988 | Steer et al. | 303/9.62 |
| 4,791,957 A * | 12/1988 | Ross | 137/505.12 |
| 5,036,878 A * | 8/1991 | Fournillon et al. | 137/493.9 |
| 5,086,807 A | 2/1992 | Lasnier et al. | |

(Continued)

FOREIGN PATENT DOCUMENTS

EP    0 382 711    6/1994

*Primary Examiner*—Stephen M. Hepperle
(74) *Attorney, Agent, or Firm*—Levenfeld Pearlstein, LLC

(57) ABSTRACT

A direct acting pressure regulator controls the flow of a gas from a high pressure source to a low pressure device. Gas is delivered from the regulator at a predetermined outlet pressure. The regulator includes a body having a high pressure inlet and defining a seat. A bonnet is engageable with the body to define a piston chamber within the body and the bonnet. The bonnet has a regulated gas outlet. A piston is disposed within the piston chamber and defines a gap between the piston and a wall defining the chamber. The piston is movable between an open regulator condition and a closed regulator condition. The piston includes a plug having a sealing surface engageable with the seat and movable toward the seat to the closed regulator condition and away from the seat to the open regulator condition. The plug includes axially disposed openings therein for communicating gas from around the plug to a central longitudinal bore in the piston. The piston has an impingement surface in flow communication with the central bore such that gas pressure on the impingement surface exerts a force on the piston to move the piston to the closed regulator condition. A spring urges the piston to the open regulator condition.

15 Claims, 2 Drawing Sheets

U.S. PATENT DOCUMENTS

| | | |
|---|---|---|
| 5,123,442 A | 6/1992 | Geuy et al. |
| 5,135,023 A * | 8/1992 | Ross .................... 137/505.11 |
| 5,234,026 A | 8/1993 | Patterson |
| 5,280,778 A | 1/1994 | Kotsiopoulos |
| 5,368,022 A | 11/1994 | Wagner |
| 5,392,825 A | 2/1995 | Mims et al. |
| 5,411,053 A | 5/1995 | Markham et al. |
| 5,522,421 A | 6/1996 | Holt et al. |
| 5,669,369 A | 9/1997 | Scott |
| 6,056,006 A * | 5/2000 | Hagerty ...................... 137/269 |
| 6,186,168 B1 | 2/2001 | Schultz et al. |
| 6,321,779 B1 | 11/2001 | Miller |
| 6,363,964 B1 | 4/2002 | Carroll |
| 6,851,447 B1 * | 2/2005 | Carroll .................. 137/505.25 |
| 2003/0075219 A1 | 4/2003 | Carroll |

* cited by examiner

DIRECT ACTING GAS REGULATOR

CROSS REFERENCE TO RELATED APPLICATIONS

This is a continuation of U.S. patent application Ser. No. 10/653,592, filed Sept. 2, 2003, now U.S. Pat. No. 6,851,447.

BACKGROUND OF THE INVENTION

The present invention is directed to a novel pressure regulator. More particularly, the present invention relates to a linear, direct acting pressure regulator for use in paint ball guns that use compressed gas to fire projectiles. The present invention is also adapted for use with other pressurized gas devices.

Sporting events that provide the participant with an adventure in military strategy and the feel of the fear and exhilaration of battle have become very popular. Generally participants are equipped with a gas projectile gun or rifle (which can launch a projectile without seriously harming the victim) and protective gear and are divided into two or more combat groups each with the goal of surviving the others.

One such sporting event is commonly referred to as "paintball". In this event, participants fire paint-filled projectile balls at one another. In a typical paintball event, participants fire projectiles, or paintballs, at one another and, when struck, are "painted" by the paint ball. The objective of such an event is to be the last person that has not been "painted" or hit with a projectile.

Typically, the projectiles used in these events are propelled, generally using a compressed gas to avoid the potential dangers of explosives such as gun powder. The dangers of explosives include not only the physical danger of the explosion but also the increased speed that such explosions impart to projectiles, potentially making innocuous projectiles, such as paintballs, deadly. Moreover, compressed gas is less costly than explosives and is readily obtainable.

When these types of systems are used, compressed gas is provided or supplied from a high-pressure source carried by the participant in a gas bottle. Although high-pressure gas is needed at the gun firing mechanism to propel the paint balls, typically the pressure in these bottles is greater than the pressure needed to safely propel the projectile within the parameters of the game. As such, it is necessary to regulate the pressure of the compressed gas provided to the gun firing mechanism to allow projectiles to be launched at a safer velocity and prevent damage to the gun. Typically, a regulator is provided, mounted to the gun or the compressed gas bottle. That is, it is carried by the game participant.

Known pressure regulator can be quite large and as such can add considerable weight to the gun. In that one of the objectives of paint ball is to avoid one's opponent, any added weight is undesirable. In addition, such large, highly machined regulators can be quite costly.

Moreover, although many such regulators in fact function well to regulate and reduce pressure from the bottle to the firing mechanism, often such pressure regulation or reduction is rough. That is, the outlet pressure is typically within a range that is specified for the particular gun. However, there remains an "optimum" pressure for the mechanism to operate.

Accordingly, there exists a need for a low cost, highly accurate pressure regulator. Desirably, such a regulator is sufficiently small and light-weight so that it does not increase, to any extent, the weight carried by a participant in a paint ball sporting event.

BRIEF SUMMARY OF THE INVENTION

A direct acting pressure regulator controls the flow of a gas from a high pressure source to a low pressure device. Gas is delivered from the regulator at a predetermined outlet pressure. The present regulator provides a low cost, highly accurate pressure regulating device that is sufficiently small and light-weight so that it does not increase, to any extent, the weight carried by a participant in a paint ball sporting event.

The regulator includes a body having a high pressure inlet and defining a seat. Preferably, the seat is conical. A bonnet is engageable with the body to define a piston chamber within the body and the bonnet. The bonnet has a regulated gas outlet.

A piston is disposed within the piston chamber and defines a gap between the piston and a wall defining the chamber. The piston is movable between an open regulator condition and a closed regulator condition. The piston includes a support or plug having a sealing surface engageable with the seat and movable toward the seat to the closed regulator condition and away from the seat to the open regulator condition. The plug includes axially disposed openings therein for communicating gas from around the plug to a central longitudinal bore in the piston. The sealing surface can be formed as a disk or as a resilient spherical (ball-shaped) element.

The piston has an impingement surface in flow communication with the central bore such that gas pressure on the impingement surface exerts a force on the piston to move the piston to the closed regulator condition. A spring urges the piston to the open regulator condition. In a present regulator, the spring is disposed within the piston chamber.

A pin valve can be disposed within the central longitudinal bore in the piston. The pin valve permits removal of the regulator from the downstream device without loss of pressure.

A present regulator includes a first seal disposed between the plug and the piston chamber and a second seal disposed between the impingement surface and the piston chamber. The piston includes a shoulder for engaging a stop surface within the bonnet to define the open regulator condition. The shoulder is disposed between the first and second seals.

In a preferred embodiment, a guide sleeve is formed as part of the body and is configured for receiving a portion of the piston. The seal between the plug and the piston chamber is disposed at about the guide sleeve. The guide sleeve extends into the piston chamber.

To maintain the regulator as a compact, efficient unit, the high pressure inlet and the regulated gas outlet are collinear with one another.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
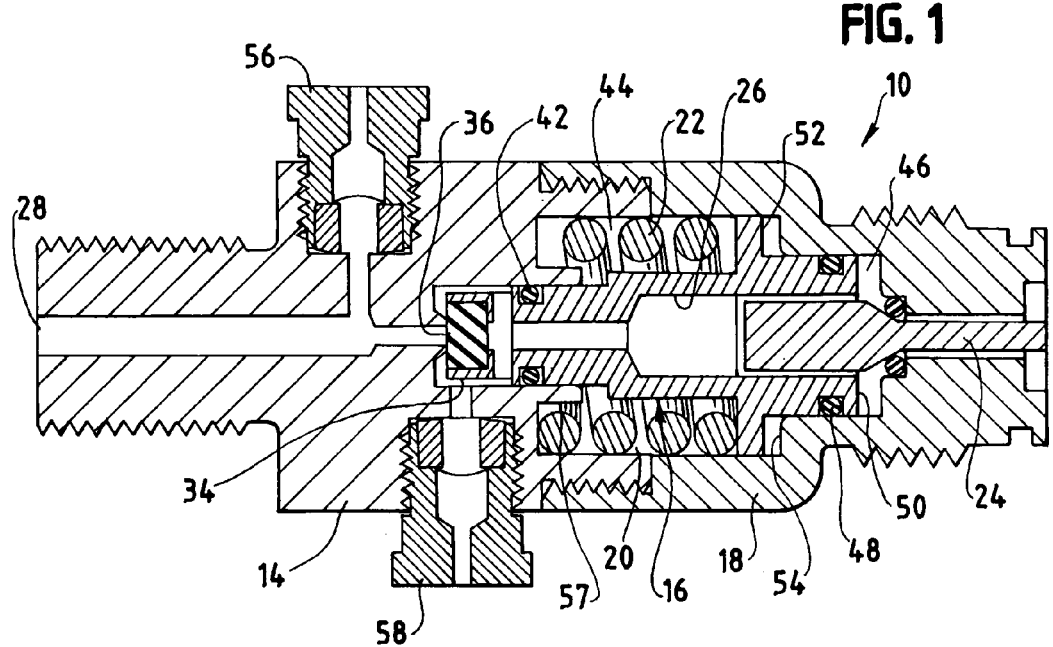
FIG. 1 is a cross-sectional view of a direct acting gas regulator embodying the principles of the present invention, the regulator being shown in the closed condition.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 2:
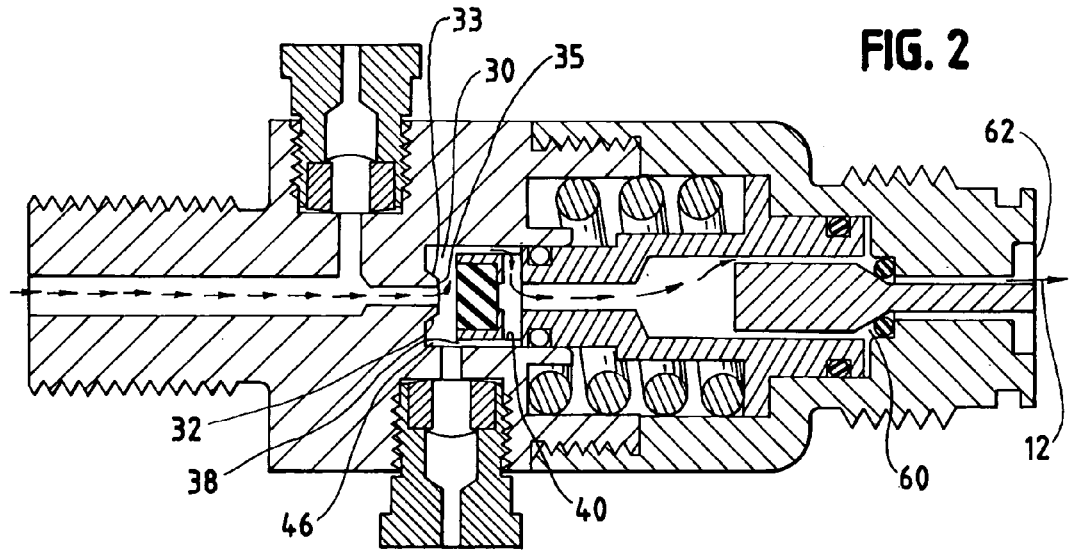
FIG. 2 is a cross-sectional view of the regulator shown in the open condition.

Referring to the figures and briefly to FIG. 2, a present regulator 10 is shown in the open condition such that a regulated flow path, indicated generally at 12, is provided from a high pressure gas source to a downstream device such as a paint ball gun or the like. The controlled downstream pressure is regulated essentially regardless of the higher upstream pressure.

The regulator 10 includes generally, a main body 14, a biased piston assembly 16 and a bonnet 18. The body 14 and bonnet 18 threadedly engage one another to seal the regulator 10 as a unit. A piston chamber 20 is defined within the sealed together body 14 and bonnet 18, and the piston assembly 16 is disposed within the chamber 20. A spring 22 is disposed about the piston assembly 16, between the piston 16 and the body 14, to bias the piston 16 (and the regulator 10) to the open condition as will be discussed in more detail below.

A pin valve 24 is disposed within a central, longitudinal bore, indicated generally at 26 in the piston assembly 16. The pin valve, which will be recognized by those skilled in the art, provides a sealable flow path from the regulator 10 to the down stream device. The pin valve 24 is maintained within the piston bore 26 by a spring (not shown) to bias the pin valve 24 closed. The pin valve 24 permits removing or separating the regulator 10 from the downstream device (e.g., the paint ball gun) without loss of gas pressure.

Gas flows into the regulator 10 through a high pressure inlet port 28 at the body side 14 of the regulator 10. The inlet port 28 opens into a plug chamber 30. A seat 32 defines the entry into the plug chamber 30. The seat 32 can be formed having a generally conical shape with angled or inclined sides 33 terminating at a flat or relatively flat end 35.

The plug chamber 30 is configured to accommodate a plug portion 34 of the piston 16. The plug portion 34 is formed at an end of the piston 16 and serves as a support for a sealing disk 36 within an end of the plug 34. The sealing disk 36 can be formed from a resilient material such as urethane or the like to form a gas-tight seal when the disk 36 is seated on the seat 32.

The plug 34 and plug chamber 30 are dimensioned and configured such that a gap, indicated generally at 38, is defined between the plug 34 and the chamber 30 wall. The gap 38 defines a portion of the flow path 12. Openings 40 are formed in the sides of the plug 34 that provide a flow path into the center (e.g., central bore 26) of the piston 16. In this manner, when the piston 16 is moved away from the seat 32 (when the disk 36 is disengaged from the seat 32), the flow path is established through the seat 32, around the plug 34, into the openings 40 and into the piston central bore 26. A seal 42, such as a neoprene O-ring, is positioned on the piston 16 between the piston 16 and the wall that defines the plug chamber 30. In this manner, gas is precluded from flowing in to the piston chamber 20 from around the plug 34.

The regulator 10 includes a low pressure region indicated generally at 44 in FIG. 1, (within the piston chamber 20) and a regulated pressure region, indicated generally at 46 in FIGS. 1 and 2, separated from the low pressure region 44 by the plug seal 42 and a piston seal 48 at an opposing end of the piston 16. The regulated pressure region 46 includes an impingement surface 50 against which the (pressure) regulated gas exerts a force for moving the piston 16 to the closed position. The piston 16 includes a shoulder 52 that engages a stop surface 54 within the bonnet 18 to prevent the piston 16 from moving beyond the open condition. A guide sleeve 57 is formed in the body 14 that extends into the piston chamber 20 from about the plug chamber 30. The sleeve 57 defines a guide for movement of the piston 16 toward and away from the seat 32 and further provides a surface against which the seal 42 acts.

The regulator 10 can include a high pressure over pressurization device 56 and a regulated pressure over pressurization device 58, such as the illustrated, exemplary high pressure and regulated pressure burst disks. Gas exits the regulator 10 through a regulated pressure outlet 62 at the bonnet side 18. As seen in the figures, the inlet 28 and outlet 62 are substantially collinear with one another.

In operation, referring first to FIG. 1, the regulator 10 is shown in the closed condition. This is the condition of the regulator when the outlet side pressure is at the desired or preset pressure. The outlet pressure on the regulated side exerts a force on the impingement surface 50 that is sufficiently high to offset the spring 22 force (i.e., compress the spring). This in turn urges the sealing disk 36 against the seat 32 to stop or isolate flow through the regulator 10.

When the pressure on the regulated side 46 begins to decrease (such as when the pin valve 24 is opened), the gas pressure exerts a lesser force on the impingement surface 50. The spring 22 force thus overcomes the gas pressure force which in turn urges the piston 16 (to the right as seen in the figures) to move the plug 34 and sealing disk 36 off of the seat 32. As the disk 36 moves away from the seat 32, the flow path 12 is established allowing gas to flow over the seat 32, and into the space (gap) 38 between the plug 34 and plug chamber 30 walls. Gas then flows through the plug openings 40 and into the piston central opening 26. The gas flows around the pin 24 and into the outlet region 60 of the regulator 10, exerting a force on the impingement surface 50. As the gas pressure at the outlet region 60 increases, the force exerted on the impingement surface 50 likewise increases until that force is sufficient to overcome the spring 22 force to urge the piston 16 closed (i.e., to the left as seen in the figures).

In that the present regulator 10 is intended to be a relatively low cost unit, the pressure of the gas exiting at the outlet 62 or the regulated gas pressure cannot be adjusted by any adjusting mechanism within the regulator 10. Rather, in order to adjust the outlet pressure, the piston spring 22 is replaced with a spring having a desired spring force. However, as will be recognized and appreciated from a study of the figures and the above description, changing the spring 22 is readily accomplished by opening the regulator 10, replacing the spring 22 around the piston 16 and resealing the regulator 10.

As set forth above, the disk 36 and various seals (or O-rings) 42, 48 are formed from a resilient, polymeric material, such as neoprene and the like. The various pressure retaining and structural elements are formed from metals, such as steel, aluminum and the like. Those skilled in the art will recognize other materials from which the regulator 10 and components can be formed.

Figure 3:
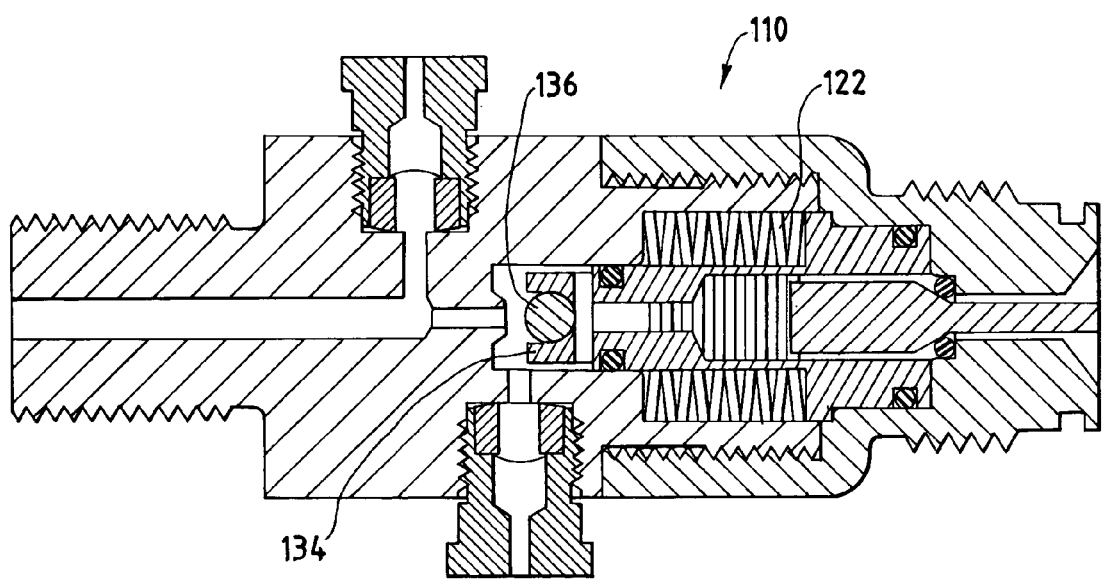
FIG. 3 is a cross-sectional view of an alternate embodiment of the direct acting gas regulator.

Referring now to FIG. 3, there is shown an alternate embodiment of the direct acting gas regulator 110. This embodiment is similar to the embodiment 10 illustrated in FIGS. 1–2, except for the main spring and plug. As is seen in FIG. 3, in this embodiment, spring washers (belleville springs) 122 are used in lieu of a coil spring 22. In addition, a spherical element (e.g., a ball) 136 formed from nylon or another resilient material is used in place of the disk 36. It has been found that such spherical elements made from such resilient materials are readily commercially available (e.g., as, for example, nylon ball bearings) and the use of these can result in reduced cost and greater regulator operating precision due to manufacturing tolerances. The remaining portions of the regulator 110 are identical or similar to that of the previous embodiment 10. Changes, to elements may be required to, for example, provide support for the belleville springs 122 or to the support or plug 134 to provide a cradle for the resilient ball sealing element 136.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A direct acting pressure regulator for controlling the flow of a gas from a high pressure source to a low pressure device, the gas being delivered from the regulator at a predetermined outlet pressure, comprising:

a body having a high pressure inlet and defining a seat;

a bonnet engageable with the body to define a piston chamber within the body and the bonnet, the bonnet having a regulated gas outlet;

a piston disposed within the piston chamber and defining a gap between the piston and a wall defining the chamber, the piston movable between an open regulator condition and a closed regulator condition, the piston including a plug having a sealing element with a sealing surface engageable with the seat and movable toward the seat to the closed regulator condition to close a flow path through the regulator and away from the seat to the open regulator condition to open the flow path through the regulator, the plug having radially disposed openings therein for communicating gas from around the plug to a central longitudinal bore in the piston, the piston having an impingement surface in flow communication with the central bore such that gas pressure on the impingement surface exerts a force on the piston to move the piston to the closed regulator condition;

a spring for urging the piston to the open regulator condition; and a pin valve disposed within the central longitudinal bore in the piston.

2. The direct acting pressure regulator in accordance with claim 1 wherein the spring is disposed within the piston chamber.

3. The direct acting pressure regulator in accordance with claim 1 wherein the sealing element is a disk.

4. The direct acting pressure regulator in accordance with claim 3 wherein the disk is formed from a resilient material.

5. The direct acting pressure regulator in accordance with claim 1 wherein the sealing element is a ball element.

6. The direct acting pressure regulator in accordance with claim 5 wherein the ball element is formed from a resilient material.

7. The direct acting pressure regulator in accordance with claim 1 including a first seal disposed between the plug and the piston chamber and a second seal disposed between the impingement surface and the piston chamber.

8. The direct acting pressure regulator in accordance with claim 1 wherein the piston includes a shoulder for engaging a stop surface within the bonnet to define the open regulator condition.

9. The direct acting pressure regulator in accordance with claim 7 including a guide sleeve formed as part of the body and configured for receiving a portion of the piston, and wherein the seal between the plug and the piston chamber is disposed at about the guide sleeve.

10. The direct acting pressure regulator in accordance with claim 1 including a guide sleeve formed as part of the body, the guide sleeve extending into the piston chamber.

11. The direct acting pressure regulator in accordance with claim 1 wherein the high pressure inlet and the regulated gas outlet are collinear with one another.

12. A direct acting pressure regulator for controlling the flow of a gas from a high pressure source to a low pressure device, the gas being delivered from the regulator at a predetermined outlet pressure, comprising:

a body having a high pressure inlet and defining a seat;

a bonnet engageable with the body to define a piston chamber within the body and the bonnet, the bonnet having a regulated gas outlet;

a piston disposed within the piston chamber and defining a gap between the piston and a wall defining the chamber, the piston movable between an open regulator condition and a closed regulator condition, the piston including a plug having a sealing element with a sealing surface engageable with the seat and movable toward the seat to the closed regulator condition to close a flow path through the regulator and away from the seat to the open regulator condition to open the flow path through the regulator, the plug having radially disposed openings therein for communicating gas from around the plug to a central longitudinal bore in the piston, the piston having an impingement surface in flow communication with the central bore such that gas pressure on the impingement surface exerts a force on the piston to move the piston to the closed regulator condition;

a spring for urging the piston to the oven regulator condition;

a first seal disposed between the plug and the piston chamber and a second seal disposed between the impingement surface and the piston chamber, wherein the piston includes a shoulder for engaging a stop surface within the bonnet to define the open regulator condition, and wherein the shoulder is disposed between the first and second seals.

13. The direct acting pressure regulator in accordance with claim 1 wherein the spring is a coil spring.

14. The direct acting pressure regulator in accordance with claim 1 wherein the spring is formed as a stack of washer-shaped spring elements.

15. The direct acting pressure regulator in accordance with claim 14 wherein the sealing element is a resilient ball element.

* * * * *